(12) United States Patent
Mendes et al.

(10) Patent No.: US 11,757,770 B2
(45) Date of Patent: Sep. 12, 2023

(54) HYBRID AD-HOC ROUTING PROTOCOL

(71) Applicant: Airbus (S.A.S.), Blagnac (FR)

(72) Inventors: Paulo Mendes, Munich (DE); Fabien Geyer, Munich (DE)

(73) Assignee: Airbus (S.A.S.), Blagnac (FR)

(*) Notice: Subject to any disclaimer, the term of this patent is extended or adjusted under 35 U.S.C. 154(b) by 0 days.

(21) Appl. No.: 17/846,769

(22) Filed: Jun. 22, 2022

(65) Prior Publication Data

US 2022/0417140 A1  Dec. 29, 2022

(30) Foreign Application Priority Data

Jun. 23, 2021 (EP) .................................... 21181278

(51) Int. Cl.
*H04L 45/44* (2022.01)
*H04L 45/12* (2022.01)
*H04L 45/24* (2022.01)
*H04L 45/00* (2022.01)

(52) U.S. Cl.
CPC ........... *H04L 45/44* (2013.01); *H04L 45/123* (2013.01); *H04L 45/24* (2013.01); *H04L 45/566* (2013.01)

(58) Field of Classification Search
CPC ....... H04L 45/123; H04L 45/24; H04L 45/44; H04L 45/566
See application file for complete search history.

(56) References Cited

U.S. PATENT DOCUMENTS

| | | | |
|---|---|---|---|
| 8,238,317 B2 | 8/2012 | Yang et al. | |
| 9,832,705 B1 | 11/2017 | Newton et al. | |
| 10,020,952 B1* | 7/2018 | Cai | ..................... H04L 12/1886 |
| 2003/0086422 A1* | 5/2003 | Klinker | ............... H04L 65/1101 370/235 |
| 2009/0122797 A1* | 5/2009 | Thubert | .............. H04W 40/246 370/392 |
| 2010/0172258 A1* | 7/2010 | Yang | ....................... H04L 45/00 370/252 |

(Continued)

FOREIGN PATENT DOCUMENTS

WO    WO 2017/063866 A1    4/2017

OTHER PUBLICATIONS

Yan Zhang et al, "Wireless Mesh Networking," Jan. 1, 2007, Auerbach Publications, p. 120.

(Continued)

*Primary Examiner* — Jeong S Park
(74) *Attorney, Agent, or Firm* — KDW Firm PLLC (57) ABSTRACT

A routing device for forwarding data packets in a data network is described. The routing device establishes a communicative connection with multiple other such routing devices that implement the same functions. A data network includes multiple routing devices as described herein. In that data network, each routing device implements and applies a proactive approach with routing tables in a stable part of the data network, and a reactive approach in an unstable part of the data network. When a packet is transmitted from a stable part of the data network to an unstable part of the data network (or vice versa), the forwarding approach is changed along the path of the packet. Thus, the routing device and the data network mitigate the effect of overhead of proactive routing approaches and the latency of reactive routing approaches.

15 Claims, 3 Drawing Sheets

(56) References Cited

U.S. PATENT DOCUMENTS

| | | | |
|---|---|---|---|
| 2014/0025775 A1 | 4/2014 | Lee et al. | |
| 2014/0185450 A1* | 7/2014 | Luo | H04L 45/44 370/410 |
| 2019/0141495 A1 | 5/2019 | Jha et al. | |
| 2019/0222496 A1* | 7/2019 | Dorai | H04L 43/0811 |
| 2020/0092138 A1* | 3/2020 | Tillotson | H04L 12/4633 |
| 2020/0092201 A1* | 3/2020 | Tillotson | G06F 9/45558 |

OTHER PUBLICATIONS

Wang ZW et al, "Vector address routing protocol for MANET," Signal Processing, 2008. ICSP 2008. 9th International Conference On IEEE, Piscataway, NJ, Oct. 26, 2008. pp. 2640-2644.

Ahlgren B. et al, "A survey of information-centric networking," IEEE Communications Magazine, IEEE Service Center, Piscataway, US, vol. 50, No. 7, Jul. 1, 2012.

Dannewitz, Christian et al, "Network of Information (NetInf)—An information-centric networking architecture," Computer Communications, Elsevier Science Publishers BV, Amsterdam, NL, vol. 36, No. 7, Jan. 27, 2013.

Wang Xiaonan et al, "Vehicular Content-Centric Networking Framework," IEEE Systems Journal, IEEE, US. vol. 13, No. 1. Mar. 1, 2019, pp. 519-529.

Arafat Muhammad Yeasir et al, "Routing Protocols for Unmanned Aerial Vehicle Networks: A Survey," IEEE Access, vol. 7, Jul. 25, 2019, pp. 99694-99720.

Anonymous, "How Switches Forward Frames Explained," www.computernetworkingnotes.com, Feb. 25, 2021, pp. 1-4.

European Search Report for Application No. 21181275 dated Nov. 3, 2021.

European Search Report for Application No. 21181278 dated Dec. 2, 2021.

European Search Report for Application No. 21181232 dated Dec. 3, 2021.

* cited by examiner

HYBRID AD-HOC ROUTING PROTOCOL

CROSS-REFERENCE TO RELATED APPLICATION

This application claims priority to EP 21181278.9 filed Jun. 23, 2021, the entire disclosure of which is incorporated by reference herein.

TECHNICAL FIELD

The description relates to the field of data networks, and particularly to a routing device for routing data packets in a data network. In particular, the description relates to a routing device that is configured to apply a hybrid ah-hoc routing protocol for forwarding packets through a data network with dynamically changing network topology and unknown or changing stability of a wireless link between nodes of the data network.

BACKGROUND

Data networks are generally used to transmit data between data producers and data consumers. Data networks typically have a topology that is known a priori. Based on the known topology of the data network, data packets are routed from one end device via one or more routers to another end device. For redundancy reasons, multiple different routes may be provided, and the routers choose one or more of these routes for transmitting data.

For example, in large scale flying ad-hoc networks, routing is a challenging task. Wireless dynamic networks, such as a mobile ad-hoc network (MANET) or a delay-tolerant network (DTN) encompass mobile hosts that can communicate with each other using wireless links. In such environments, a route between any pair of hosts, i.e., end devices like data consumer and data producer, may consist of wireless hops through one or more nodes, i.e., network nodes like routing devices. An important aspect in such networks is finding the best strategies to forward data between any pair of nodes, taking into account that any node in the network is mobile and the wireless channel conditions also change over time. It is assumed that in some cases it is possible to find and maintain routes between some nodes, while in other cases forwarding needs to be done hop by hop even in the absence of an end-to-end path.

SUMMARY

It may be seen as an object to develop a routing approach for a data network that is able to adapt to network segments having different dynamics, transmission characteristics, and/or behavior. This object is solved by the subject matter disclosed herein.

A routing device is disclosed herein. Further developments of the disclosure herein can be derived from the following description.

According to an aspect, a routing device for routing data packets in a data network is provided. The routing device comprises a routing engine with a routing information base (RIB), a neighborhood engine with a neighborhood information base (NIB), and a forwarding engine with a forwarding information base (FIB). The NIB is configured to contain at least one entry for neighbor nodes of the routing device. The FIB is configured to contain at least one entry for destinations. The routing device is configured to extract a destination value from a first data packet, search the FIB for the extracted destination value. The routing device is further configured to, when the FIB contains an entry for the destination value, forward the first data packet according to the entry in the FIB, otherwise, when the FIB does not contain an entry for the destination value, select a first group of at least two neighbor nodes from the NIB and forward the first data packet to the selected first group of at least two neighbor nodes in a spray operation mode, wherein, in the spray operation mode, the forwarding engine forwards the first data packet to the selected first group of at least two neighbor nodes that have a certain probability to be in contact with the extracted destination. The routing device is further configured to, after forwarding the first data packet in the spray operation mode, receive a feedback packet from the selected first group of at least two neighbor nodes, and generate an entry in the FIB for the extracted destination based on the feedback from the selected first group of at least two neighbor nodes, and use the generated entry in the FIB for forwarding a second data packet in a focus operation mode, wherein in the focus operation mode the forwarding engine forwards the second data packet to a neighbor node in accordance with an entry in the FIB.

Typical routing mechanisms implement a proactive approach or a reactive approach. In a proactive approach, the routing protocol exchanges messages to create a state of the network and to create routing tables that define which network or end device can be reached via which router. In a reactive approach, a path for transmitting data is identified when data is to be transmitted. The state of the network is not communicated beforehand. Compared to the proactive approach and generally speaking, the reactive approach has a lower overhead (the routing tables are not created before data is to be transmitted), but a higher latency (because a suitable path needs to be found when data is to be transmitted).

Instead of implementing a proactive or reactive approach, the routing device described herein implements a hybrid approach according to which a proactive mechanism is utilized in a stable network segment, and a reactive mechanism is utilized in an unstable segment of the network.

The routing device is configured to, when the FIB does not contain an entry for the destination value, select a first group of at least two neighbor nodes from the NIB based on a connectivity characteristic between the routing device and a group of neighbor nodes.

The first data packet is sent in a spray operation mode to probe the best path. Then, the second and any subsequent data packet are sent in a focus operation mode in accordance with the respective entry in the FIB.

The routing device is configured to apply two forwarding modes: when an entry for a destination exists in the FIB, that entry is used for forwarding the packet (focus mode, the path or at least the next hop is known from the FIB), otherwise, when no entry exists in the FIB, a spray operation mode is used for forwarding the packet. In the spray operation mode, the routing device sends a message to at least two neighbor nodes that are retrieved from the NIB, collects feedback from these at least two neighbor nodes, selects one of these two neighbor nodes to create and entry in the FIB, and then uses that entry for forwarding packets to the indicated destination in the focus mode.

According to an embodiment, the routing device is configured to receive destination state information, DSI, from multiple neighbor routing devices, and further configured to determine a connection stability value to each neighbor routing device, and further configured to ignore the DSIs received from neighbor routing devices with a connection stability value below a predetermined stability threshold value.

In this embodiment, the routing device filters the received destination state information, DSI, received from neighbor routing devices and uses only those neighbor routing devices which are connected to the current routing device via a stable link (i.e., the stability value of the link is above a predetermined stability threshold value). This subset of filtered routing devices with a stable link are used to be announced by the current routing device to other neighbor routing devices. In other words, the routing device implements a selective routing announcing scheme, in which routes (links to neighbor routing devices) are only announced by the current routing device to other (neighbor) routing devices when the stability of the received DSIs meets a certain stability criterion, i.e., the stability value is above the threshold stability value. In one embodiment, the routing device is configured to actively drop DSIs with a connection stability value below the predetermined stability threshold value.

According to a further embodiment, the routing device is configured to generate the entry in the FIB for the extracted destination so that the entry contains at least the destination value and the neighbor node via which the corresponding destination can be reached.

Thus, the entry in the FIB can be used to forward a data packet for a certain destination to the next hop indicated in the FIB entry. In other words, in the focus mode, a data packet is forwarded in a determined manner to a certain (single) neighbor node (next hop towards the destination).

According to a further embodiment, the routing device is configured to monitor a performance metric value of a data transmission process between the routing device and the extracted destination of the first data packet. When the performance metric value increases, the routing device is configured to continue forwarding data packets to the extracted destination in accordance with an entry in the FIB, and additionally select a second group of at least two neighbor nodes from the NIB based on a connectivity characteristic between the routing device and the group of neighbor nodes and forward the first data packet to the selected second group of at least two neighbor nodes in a spray operation mode.

Thus, when the performance metric value of the data transmission in the focus mode increases, the routing device uses the spray mode to two other neighbor nodes in order to identify alternative routers to the destination. The performance metric value may be one of transmission latency, signal to noise ratio (SNR), packet loss, delay, throughput, etc., or a combination thereof.

According to a further embodiment, the routing device is configured to receive a feedback packet from the at least two neighbor nodes from the second group and configured to generate an entry in the FIB for the extracted destination based on the feedback from the neighbor nodes of the second group.

According to a further embodiment, the routing device is configured to forward the first data packet to one neighbor node from the first group and to one neighbor node from the second group in a focus operation mode.

In this embodiment, the routing device forwards the data packets to the same destination via two different neighbor nodes in a focus operation mode.

According to a further embodiment, the routing device is configured to remove an entry from the FIB based on the performance metric of the data transmission process between the routing device and the extracted destination of the first data packet when the performance metric of the data transmission of a specific entry in the FIB is higher compared to the performance metric of at least one other entry for the same destination.

In this embodiment, routes of under-performant entries in the FIB are removed, namely by comparing the performance metric of an entry to the performance metric of other entries.

According to a further embodiment, the routing device is configured to store the first data packet unless the FIB is populated with an entry that corresponds to the destination value extracted from the first data packet or when a connection of the routing device to the neighbor nodes of the first group is interrupted.

Thus, the routing device implements a store-and-forward mechanism. Packets are cached by the routing device while the interfaces towards the most suitable next hops are down or unless the FIB is populated with entries. Packets are stored until a suitable next hop is available or until the packet validity expires.

According to a further embodiment, the routing engine is configured to determine a set of next hops that are able to reach a predetermined destination with a predetermined cost.

The costs refer to the costs of a destination state information. The costs serve as a weight to measure the importance of a path in relation to a defined set of metrics (transmission latency, signal to noise ratio (SNR), packet loss, delay, throughput, etc., or a combination thereof).

According to a further embodiment, the routing engine is configured to receive a list of destination state information, DSI, from each neighbor node that is directly interconnected with the routing device, to announce a list of own DSI to each neighbor node, and to determine a subset of neighbor nodes to include in the RIB.

Thus, the routing engine operation is based on reachability information exchanged between stable neighbors. Received DSIs are filtered based on the stability of the announcing neighbor, i.e., the DSIs sent by unstable neighbors are ignored.

According to a further embodiment, a DSI includes information about the cost to reach a destination via a certain neighbor node.

According to a further embodiment, the destination value is an address of a destination node or a subnet, or the destination value is a data name.

The routing engine is independent of the type of destination, host based or name based.

According to a further embodiment, the neighborhood engine is configured to collect information about the status of each one of the neighbor nodes of the routing device. The collected information includes the following parameters: availability of the neighbor node; capacity of the neighbor node; connectivity between the routing device and the neighbor node; and link quality between the routing device and the neighbor node.

According to a further embodiment, the routing device is configured to repeatedly send a message in order to determine a value for the at least one of the parameters.

Thus, the neighborhood engine periodically receives information about the status of the neighbor routing devices so that the link quality is updated repeatedly.

According to a further embodiment, the neighborhood engine is configured to determine a stability of each neighbor node based on the availability, capacity, and link quality.

The neighborhood engine is configured to provide the stability of each neighbor node to the routing engine and to the forwarding engine.

Summing up, the routing device described herein is configured to establish a data network with multiple other such routing devices that implement the same functions. A data network includes multiple routing devices as described herein. In that data network, a proactive approach with routing tables is used in a stable part and a reactive approach is used in an unstable part. When a packet is transmitted from a stable part of the data network to an unstable part of the data network (or vice versa), the forwarding approach is changed along the path of the packet.

The data network can be established between routing devices in a dynamic environment, e.g., with routing devices located aboard mobile units, like vehicle, watercraft, aircraft, satellites, etc.

A routing device may be located aboard an aircraft. The routing device is configured to establish a data connection with one or more end devices located in the same aircraft to provide data services (data producers and data consumers, upload or download data, etc.) to these end devices. A data network set up of multiple routers implements the routing approaches described above to transmit data packets between two end devices located aboard different aircraft or at different positions.

In one example, an aircraft with a routing device and one or more end devices that are communicatively connected with the routing device is provided. The routing device is connected to other routing devices aboard other aircraft.

BRIEF DESCRIPTION OF THE DRAWINGS

The subject matter will hereinafter be described in conjunction with the following drawing figures, wherein like numerals denote like elements, and wherein.

DETAILED DESCRIPTION

The following detailed description is merely as examples in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

Figure 1:
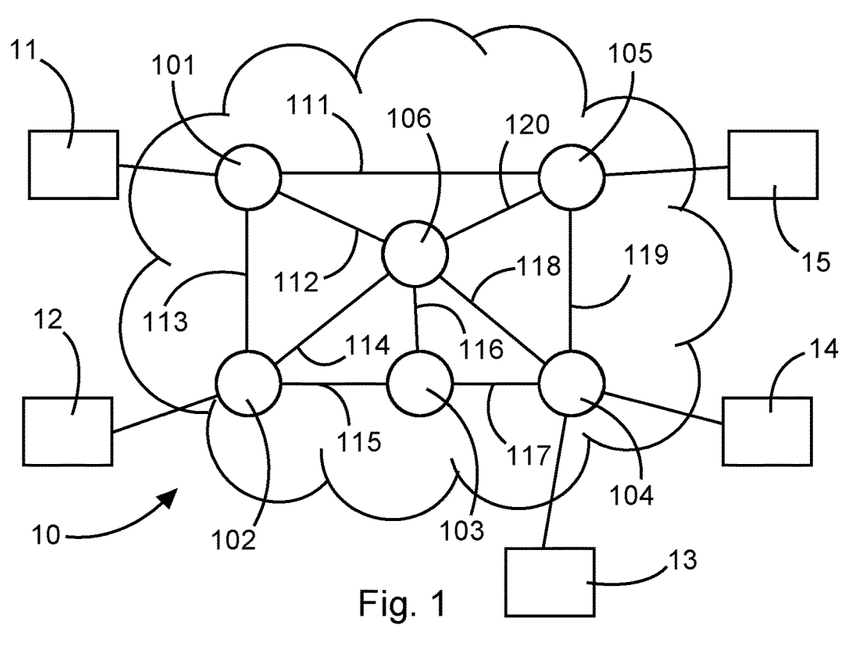
FIG. 1 is a schematic representation of a data network.

FIG. 1 shows an example embodiment of a data network 10. The data network 10 may particularly be a network that includes at least some mobile components, like in an airborne mobile ad-hoc network that is set up amongst flying devices (e.g., commercial aircraft, military aircraft, satellites, or the like), some of which have a connection to a ground network infrastructure.

An airborne mobile ad-hoc network typically encompasses intermittent wireless, Radio Frequency (RF) and Free Space Optics (FSO) links among flying devices, as well as between flying devices and the ground: wireless links are intermittently available, since flying devices are only collocated at certain time slots, which may be known in advance or not. It is assumed that in an airborne mobile ad-hoc network, flying devices may dynamically discover each other, through local operations via RF links or based on offline data such as geo-position (provided by systems such as automatic dependent surveillance—broadcast, ADS-B), flight missions and orbits, forming a network with a flat hierarchy.

The above mentioned scenarios with airborne mobile ad-hoc networks typically encompass multi-hop wireless networks with different dynamic levels. On the one hand, a military aircraft multi-hop wireless network is highly dynamic, including formation phases and flying phases in which aircrafts have a more random movement (e.g., in combat situations). On the other hand, multi-hop wireless networks encompassing commercial aircrafts or spaceborne equipment (e.g., low earth orbit satellites) have a more predictable behavior, since aircraft mobility is defined based on predefined routes and satellites move in orbits. Nevertheless, some dynamic behavior is expected, due to clustering effects, conditions of the links (e.g., due to distance between communicating nodes), and intermittent availability of links (e.g., inter-satellite links may be intermittently present between any pair of satellites).

Depending on the dynamic nature of such networks, MANET or DTN routing is normally applied. In the former case, routing aims to find and maintain an end-to-end path between any pair of nodes. Such a goal may be achieved in a reactive or proactive approach. Proactive routing protocols (e.g., Optimized Link State Routing Protocol, OLSR, Topology Dissemination Based on Reverse-Path Forwarding, TBRPF, and Destination-Sequenced Distance Vector routing, DSDV) aim to keep consistent and up-to-date routing information between every pair of nodes in the network by propagating route updates at fixed time intervals. Each node must maintain this information in routing information tables. Reactive protocols learn about how to forward traffic in a network only when traffic requests are submitted by applications. Since proactive routing algorithms maintain knowledge about end-to-end connectivity before the arrival of any transmission requests, such requests are served faster than in the reactive approaches, meaning the proactive protocols have in general lower latency than reactive ones. However, since the learned network topology changes over time, proactive protocols also lead to higher overheads to maintain the topology up-to-date.

On the other hand, reactive routing protocols (e.g., Ad-hoc On-demand Distance Vector routing, AODV, Dynamic Source Routing, DSR, and Temporary Ordered Routing Algorithm, TORA) establish a route to a given destination only when a node requests it by initiating a route discovery process. Once a route is established, the node keeps it until the destination is no longer accessible, or the route expires. Reactive protocols tend to be more efficient than proactive protocols in terms of control overhead and power consumption because routes are only created when required.

However, any type of MANET protocol will fail if link intermittency leads to situations where no end-to-end path may exist at each moment in time, which consequently causes frequent partitions and high queuing delay. Such a situation may result from node mobility, power-saving schemes, physical obstacles, and dark areas (i.e., overcrowded with access points operating in overlapping channels or no infrastructure at all). For these highly dynamic scenarios, several opportunistic routing protocols have been proposed making usage of replicas of the same message to combat the inherent uncertainty of future communication opportunities between nodes. In order to carefully use available resources and reach short delays, many protocols perform forwarding decisions using locally collected knowledge about node behavior to predict which nodes are likely to deliver a content or bring it closer to the destination. For that, nodes must have enough processing power and storage to keep data until another good intermediate carrier node or the destination is found, following a store-carry-and-forward (SCF) paradigm.

Proposed opportunistic routing approaches range from using node mobility to flood the network for fast delivery (e.g., Epidemic routing) up to controlling such flooding to achieve the same results based on: encounter history (e.g., Probabilistic Routing Protocol using the History of Encounters and Transitivity, PROPHET), optimized delivery probability (e.g., Spray and Wait), prioritization, or inferring different level of social interactions). In any case, all opportunistic routing protocols follow reactive approaches, since routing decisions about the best set of neighbors to consider to forward/replica packets are only done when a packet is received. The need to perform such local decisions plus the fact that the best next hops may not be available when a packet arrives, leads to poor forwarding (when packets are passed to a less optimal neighbor) or to long delay (to wait for the best neighbors to be available). Such performance limitation may be mitigated by allowing nodes to learn about the visiting patterns of neighbor nodes, as well as about the probabilities of each node to lead to the desirable destination in a short period of time. The latter may require the exchange of information about reachability among neighbor nodes, which is only feasible if the network dynamic is moderated.

In comparison to existing Zone Routing Protocols, the routing scheme described herein does not assume a fix division of a network in stable zones (e.g., with the size of the zone being determined by radius of length $\rho$, where $\rho$ is the number of hops to the perimeter of the zone and not the physical distance). The preferred use case of the routing device described herein are mobile entities with a dynamically changing network topology, so that a static segmentation of the data network into stable and unstable zones (or segments) may not be sufficient to improve the performance of the routing.

Rather, the data network 10 implements a routing protocol that is able of having different behavior (packet replication, reactive routing, proactive routing) in different segments of the network based on its capability to infer about the dynamics of the network in such segments.

FIG. 1 shows a data network 10. Multiple end devices 11 to 15 act as data producers and/or data consumers and exchange data via the routing devices 101 to 106. Each of the end devices 11 to 15 is connected via a data link to at least one routing device. The routing devices are intermittently connected with each other via data links 111 to 120. The data links between the end devices and the routing devices may be wireless or wired connections. The data links between the routing devices preferably are wireless connections.

The proposed protocol aims to mitigate the limitations of reactive, proactive and opportunistic routing protocols, namely: i) avoid the overhead of the probing phase of reactive protocols; ii) reducing the overhead of the link state information dissemination of proactive routing protocols; and iii) reducing the cost (replication) of opportunistic routing protocols.

The proposed protocol allows the deployment of different types of networks, from a very dynamic one (e.g., military aircraft) to less dynamic ones (satellite constellation), passing by predictable ones (multi-hop commercial aircrafts) without the need to develop and maintain different routing protocols.

Within each of the mentioned use-cases, the proposed protocol aims to provide a higher performance, by combining the lower latency of proactive approaches, with the higher adaptability of reactive approaches and the higher robustness of opportunistic protocols.

In what concerns existing networking paradigms, the proposed routing protocol aims to support both the traditional host based communication model used in the Internet, such as new information-centric paradigms, such as Named-Data Networking (NDN). This means that the proposed protocol is able to find the best way to deliver a packet: an IP data packet or an NDN interest packet to its destination, which is a receiver host in the former case, and a source of data in the latter one.

The routing devices described herein with reference to the data network 10 particularly implements the following three aspects: supporting host based and name based communication, operating in the presence of intermittent connectivity between routing devices; combining reactive and proactive mechanisms aiming to increase the probability of delivering packets with low delay.

Figure 2:
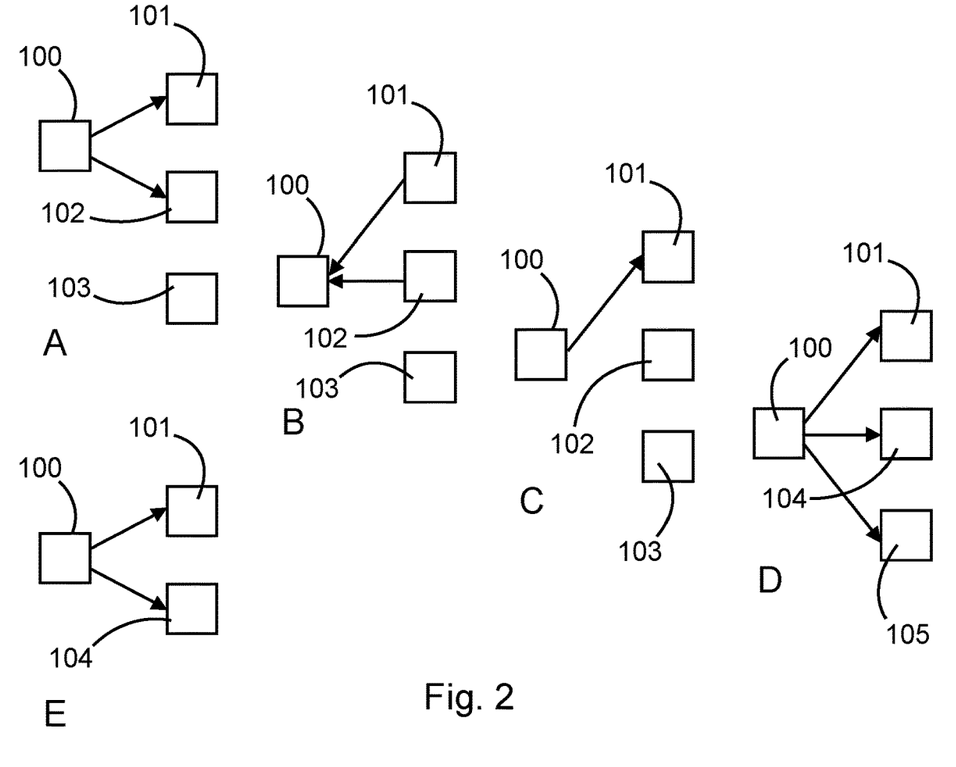
FIG. 2 is a schematic representation of a data packet forwarding mechanism.

FIG. 2 generally describes a store-spray-and-focus forwarding approach and the related communication between neighbor nodes (routing devices). The approach is described with reference to five stages indicated by capital letters A to E.

FIG. 2 illustrates the forwarding operation in an unstable neighborhood: in this example the forwarding engine starts at stage A in a spray mode since the FIB of the routing engine 100 has no entries for the destination. Based on the connectivity between the routing device 100 and the three neighbor routing devices 101, 102, and 103 (collected from the NIB of the routing device 100) towards the desirable destination, only two neighbor routing devices 101, 102 are selected and further considered for data forwarding. The routing device 100 sends a message to the routing devices 101, 102. At stage A, the routing device 100 operates in a spray mode and sends messages to routing devices 101, 102. At stage B, the routing device 100 monitors the links to the neighbor routing devices and receives a feedback from the neighbor routing devices 101, 102. The feedback received from these two neighbor routing devices leads to a new entry to be added to the FIB of routing device 100. That entry is used for the next set of packets (the forwarding engine operates in a focus mode), as indicated at stage C, and the routing device 100 transmits data packets directly to routing device 101, i.e., the routing device 100 operates in a focus mode in stage C. Assuming now that after some transmissions, the latency of the link between the routing devices 100, 101 starts to increase. Then, the protocol uses a combination of focus and spray operation, by still using the current neighbor in the FIB (i.e., routing device 101) in a focus mode but also selecting a set of neighbors from the NIB (namely routing devices 104, 105) in a spray mode, as indicated at stage D and aiming to increase the probability of delivery with low latency. After receiving the feedback of the new transmissions (from routing devices 104, 105), the new neighbors are added to the FIB of the routing device 100, and the under performant neighbor is removed from the FIB (in the present example, routing device 105 is removed). After this, the forward engine enters again in a focus operation mode to both neighbor routing devices 101, 104, as indicated at stage E.

Figure 3:
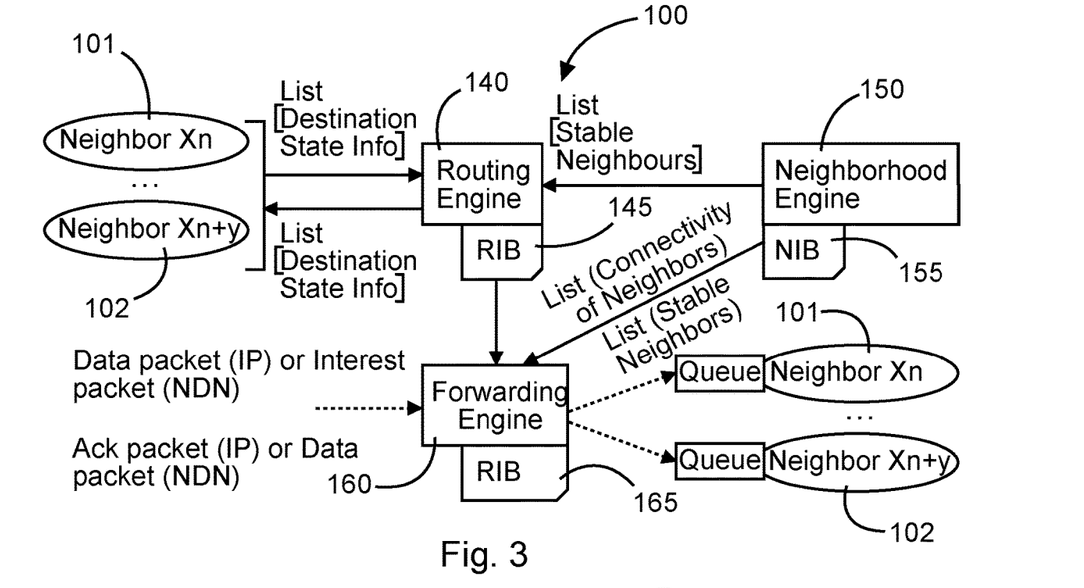
FIG. 3 is a schematic representation of the components of a routing device.

FIG. 3 schematically shows the structure of a routing device 100.

The routing device 100 includes a routing engine 140 with an associated routing information base, RIB, 145, a neighborhood engine 150 with an associated neighbor information base 155, and a forwarding engine 160 with an associated forwarding information base 165.

The routing engine 140 receives a list with destination state information, DSI from one or more neighbor routing devices 101 and sends a list with its own DSI to one or more neighbor routing devices 101. The DSI are stored in the RIB. The neighborhood engine 150 provides a list of stable neighbor routing devices to the routing engine 140 and to the forwarding engine 160 and provides a list including the connectivity of neighbor routing devices to the forwarding engine 160. The forwarding engine receives a data packet and/or an acknowledge packet (when applying the IP technology) or an interest packet and/or a data packet (when applying the NDN technology). The received messages are forwarded based on the entries in the FIB. The messages may be stored in a queue before transmitting them to a neighbor routing device 101, 102. One queue (implemented as a cache, for example) may be assigned to each outgoing link to a neighbor routing device, as indicated in FIG. 3.

Figure 4:
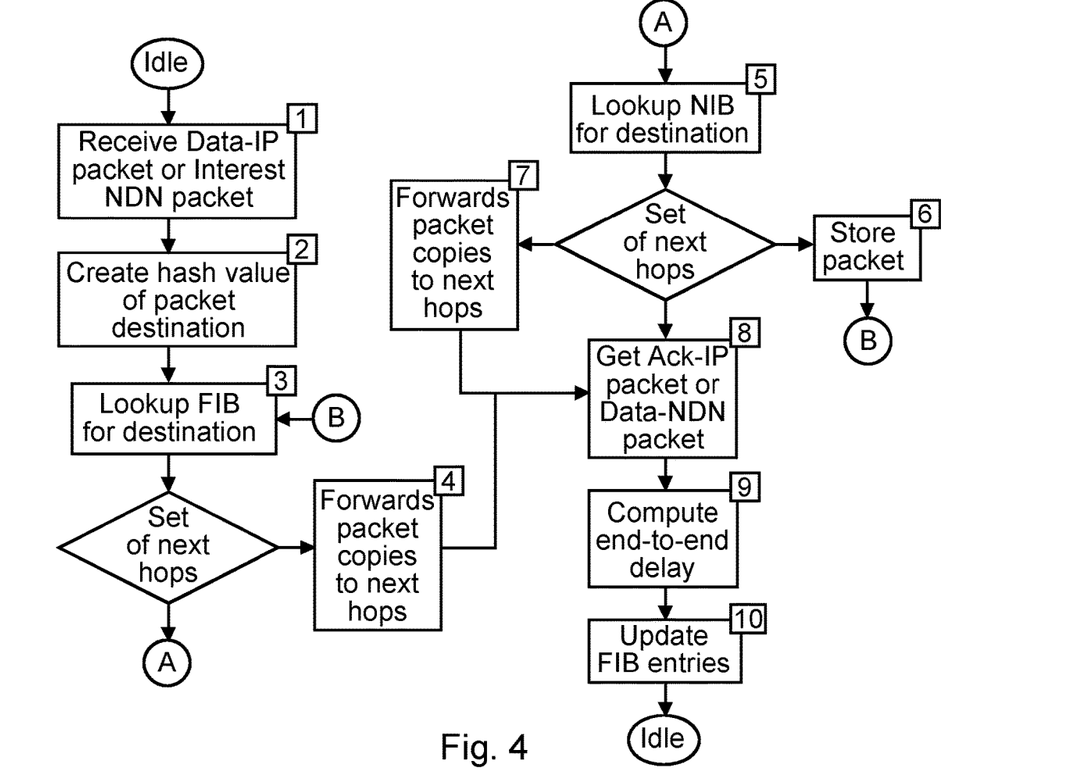
FIG. 4 is a schematic representation of the steps executed when implementing the approach of FIG. 2.

FIG. 4 shows the operation procedure of the forwarding engine 140 of FIG. 3.

The forwarding engine implements the store-spray-and-focus (SSF) strategy (as described with reference to FIG. 2) which takes advantage of information collected about the reachability of the destination and local contextual information, aiming to decrease the latency and increase the delivery probability. Store-and-forward means that packets are cached while the interfaces towards the most suitable next hops are down. In this case, packets are stored until a suitable next hop is available (e.g., wireless interfaces get up) or until the packet validity expires. The packet validity parameter is set by the application. Focus means that destinations are reached only by a set of neighbors through which the current node has information (cost, latency) about how to reach the destination. Spray means that the current node aims to reach the destination through a set of nodes that have high probability to be in contact with the destination.

The forwarding decision (spray-and-focus) is based on two data structures: the Forwarding Information Base (FIB) kept by the forwarding engine, and the Neighbor Information Base (NIB) kept by the neighborhood engine. The former is used in a focus operation mode, while the NIB is used in a spray operation mode. Each entry in the FIB is related with a specific Destination ID, and has the following format:

FIB entry:{destination ID; list of {neighbor ID, latency}}.

An entry in the FIB can be created when an entry for that destination is present in the Routing Information Base (RIB), or as a result of a spray operation. In the former case the field latency is set to equal to the field distance of the corresponding entry in the RIB. As a result of a spray operation mode, some entries in the FIB can also see their list of neighbors changed, changing the set of neighbors to consider in the focus operation. The latency value in each entry is updated based on a Round-Trip-Time (RTT), or two-way latency, measured as the time lapsing between the forwarding of a packet and the reception of a response (an ack in the case of an IP data packet, or a data packet in the case of a NDN interest packet). Destinations that are in unstable areas or that are served by UDP traffic will not be represented in the FIB, meaning that packets to them will be forwarded always in a spray operation mode.

The entries in the FIB may be indexed by a hash value representing the destination. Thus, the forwarding engine is able of processing data packets to a specific destination defined by an IP address (host based approach) as well as interest packets to a specific data source defined by a data name (named defined networking). To support both paradigms IP and NDN, the first operation upon the reception of an IP data packet or an Interest packet is the computation of a hash value of the destination ID carried in the packet, which is used to lookup the FIB for the best set of entries (steps 1 and 2 in the flowchart in FIG. 4). In other words, starting from an idle state, the routing device receives a data IP packet or an interest NDN packet in step 1 and creates a hash value of the packet destination in step 2.

The forwarding mechanism aims to reduce the overhead (number of replicas) while ensuring low latency of delivery. To achieve such a goal, the forwarding mechanism aims to handle each destination as much as possible in a focus operation mode, by giving more preference to the information in the FIB than in the NIB. In step 3, the forwarding engine searches the FIB for an entry relating to the destination of the packet to be forwarded. This provides a set of next hops based on which packet copies are forwarded to the next hop(s) in step 4. When a new packet arrives, a suitable set of next hops is extracted from the FIB, aiming to keep the probability of success closer to 1 (reach high delivery probability with low delays). If that is not possible (there are no entries in the FIB for that destination or the existing entries are not enough to ensure high delivery probability with low latency), a suitable set of next hops can be extracted from the NIB (step 5) with a certain probability dependent upon the connectivity of the neighbor (probability of the neighbor to meet the destination) and the probability that the neighbor has to forward a packet. With the set of next hops read from the NIB in step 5, the packet is stored in step 6 and packet copies are forwarded to the next hops in step 7. Extracting a suitable set of next hops from the NIB means that the forwarding engine selects a subset of neighbors based on neighbor stability and neighbor connectivity with:

Neighbor stability=f(availability, capacity, link quality)

After forwarding the packets in steps 4 or 7, the forwarding node may receive feedback packets (ack for TCP/IP data packets and data packets for interest packets), step 8, that are used to estimate the delay towards the destination, step 9. Based on these feedback packets and the estimated delay, the forwarding node (i.e., the current routing device) updates the value of the corresponding FIB entry or adds/removes entries from the FIB in step 10. Adding a new FIB entry (or a new neighbor in an already existing FIB entry) may happen when the feedback is received as a result of a spray operation. Removing a FIB entry or a specific neighbor from a FIB entry may happen when the feedback received from that neighbor, in a focus mode, shows an increase of latency (steps 8 to 10).

The received feedback packets (ack for TCP/IP data packets and data packets for NDN interest packets) are also forwarded based on their destination ID, unless otherwise stipulated. For instance, data packet in NDN may follow the information stored in the Pending Interest table (PIT).

Again with reference to FIG. 3, the routing engine 140 is responsible for computing a set of next hops that are able to reach a certain destination with a certain cost. This computation is done based on reachability information exchanged between stable neighbors. Stability of nodes is dictated by the neighborhood engine 150. The routing engine operation is defined by three major states: reception of a list of Destination State Information (DSI) from each neighbor node (incoming list from routing device 101); Computation of a subset of neighbors to include in the Routing Information Base (RIB); and Announcement of DSIs to neighbor nodes (outgoing list to routing device 102).

The routing engine operation is based on reachability information exchanged between stable neighbors. Thus, the reception of DSIs is filtered based on the stability of the announcing neighbor, meaning that DSIs sent by unstable neighbors are ignored.

Each DSI provides information about the cost to reach the destination via a certain neighbor node, and information about the time at which the DSI was created. The DSI is based on the following format:

DSI format:{Destination ID, neighbor ID, cost, timestamp}

The DSI timestamp allows nodes to infer about their distance towards the destination. This information is mostly useful if the traffic going to the destination is based on a transport protocol/method that does not provide feedback information, such as UDP.

In order to allow nodes to use DSI timestamps to infer about their distance to the destination, all networking devices must be synchronized in time, in case they have different system times. One may assume that in many use-cases all nodes will have the same system time. But even in this situation, clocks may drift. So, one may assume that there is a process to allow nodes to synchronize their clocks. A first hypothesis is to use the Network Time Protocol (NTP). However, NTP requires a client-server operation, which means that all nodes should synchronize their clocks before starting their operation, and while having connectivity to an NTP server. A second hypothesis assumes that nodes have a GNSS (Global Navigation Satellite System) based unit which can be queried for time, making each of them a Stratum 1 clock. This is a viable solution for outdoor networks, as is the case of many ad-hoc networks. A third hypothesis is to use alternative protocols able to synchronizes N clocks with enough performance.

The destination can be an IP address identifying a host or a subnet, or a data name (e.g. as defined in NDN), meaning that the routing engine operation is independent from the type of destination (host based or name based). For that reason, when the routing engine gets a local announcement (from a local service) its first operation is to compute a hash value corresponding to a vector of numbers to represent the destination (IP address or name). This means that the Destination ID has the following format:

Destination ID=[number, . . . ]=Hash (destination)

Some of the accepted DSIs may provide information about alternative neighbors to reach the same destination ID. In such a case, the routing engine selects a subset of the announcing neighbors based on neighbor stability, as provided by the neighborhood engine; cost of DSI; and timestamp of DSI.

The selection mechanism is done by filtering out neighbors that have low stability and announce DSIs with high cost and old timestamp (e.g., an algorithm based on configuration metrics or a neural network able to infer about cost, timestamps and stability patterns). The selected subset of neighbors, together with information computed based on the announced DSIs, is placed in the RIB. An entry on the RIB has the following format:

RIB entry:{destination ID; list of {neighbor ID, cost, timestamp, distance}}

From the information transported in the DSI, the cost and timestamp are stored in the RIB. Based on the timestamp, the node computes the distance, as a function of the timestamp and the reception time of the DSI. While the timestamp and cost will be used to further announce this DSI, the distance will be passed to the forwarding engine.

In what concerns the announcements of DSIs, the routing engine makes usage of the information stored in the RIB to define a DSI for each stored destination. In each DSI, the announced cost is equal to the cost stored in the RIB plus a number representing the cost induced by the node itself. The resulting DSIs may be broadcasted to all neighbors in "Hello" messages, as described before, based on the following format:

Announced DSI:{Destination ID, neighbor ID, cost (received cost+local cost), timestamp}

Figure 5:
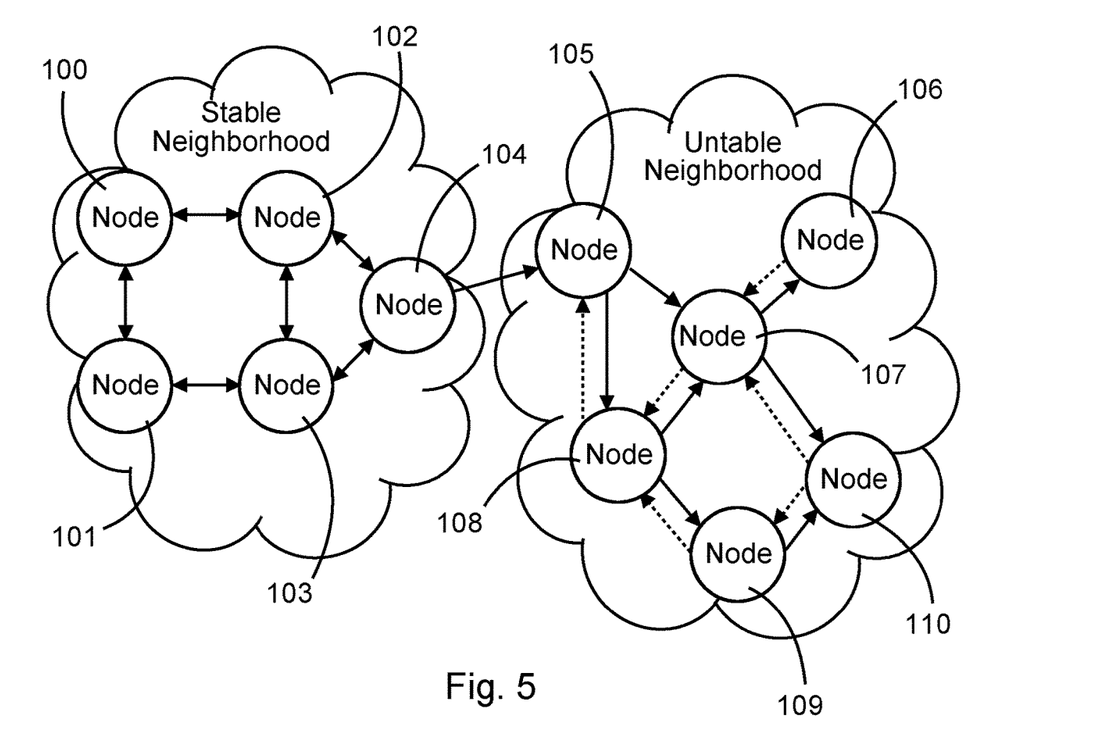
FIG. 5 is a schematic representation of a data network with different routing operational segments.

As shown in FIG. 5, the proposed protocol may lead to the creation of different behavior areas in a network. In stable areas/neighborhoods (on the left side of FIG. 5), nodes build RIBs based on exchanged DSIs, allowing them to make more accurate forwarding decisions based on knowledge about how to reach valid destinations with a certain cost. In unstable areas/neighborhoods (on the right side of FIG. 5), nodes do not exchange DSIs, and so need to forward packets taking advantage of all available transmission opportunities: replicated packets aiming to increase the probability of delivering packets with low delay. The proposed forwarding engine aims to reduce the cost by keeping the number of replicas as low as possible and limited to unstable neighborhoods or segments of the data network. In the unstable segment, data packets and ack packets (TCP/IP technology) or interest packets and data packets (NDN technology) are exchanged between neighbor nodes.

Again with reference to FIG. 3, the neighborhood engine 150 collects information about the status of the neighborhood of a node, based on the following set of information about each neighbor:

Availability (e.g., time between each wireless contact, and duration of each time contact);

Capacity (e.g., battery level);

Connectivity (e.g., inter-contact times and contact durations with any other node in the network);

Link quality (e.g., average throughput, bit error rate, received signal strength indication);

Availability provides a node with information about the usefulness of the link towards a neighbor. Availability is inferred by the node itself. On the other hand, connectivity provides a node with information about how well connected its neighbors are. The node gets the information about the connectivity level via the Hello messages sent by neighbors. Both, availability and connectivity, are inferred based on similar metrics, such as inter-contact times. The inter-contact time metric (in the availability and connectivity parameters) can be used to infer about the latency of a transmission through a neighbor, since such metric provides information about the delay induced by a neighbor to transmit a packet to a certain destination.

Measurement activities are performed by periodic Hello messages broadcasted by nodes with a time-to-live of one (1). The result of the measurement activities is placed in a Neighbor Information Base (NIB) indexed by neighbor ID. Each entry encompasses a tuple with all the information collected about the neighbor in the following form:

NIB entry: {Neighbor ID, Availability, Capacity, Connectivity, Link quality}

The neighborhood engine uses the information on the NIB to infer about the stability of each neighbor node. The stability utility function is as follows:

Stability=f(availability, capacity and link quality)

The information about the stability of neighbors is passed to the routing and forwarding engines. The latter also receives from the neighborhood engine information about the connectivity of each neighbor.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the disclosure herein in any way. Rather, the foregoing detailed description will provide those skilled in the art with a convenient road map for implementing an example embodiment of the disclosure herein. It will be understood that various changes may be made in the function and arrangement of elements described in an example embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above example embodiments may also be used in combination with other features or steps of other example embodiments described above. Reference signs in the claims are not to be construed as a limitation.

LIST OF REFERENCE SIGNS 10 data network
11-15 end device
100-110 routing device
111-120 data links
140 routing engine
145 routing information base
150 neighborhood engine
155 neighborhood information base
160 forwarding engine
165 forwarding information base

The invention claimed is:

1. A routing device for routing data packets in a data network, comprising:
a routing engine with a routing information base, RIB;
a neighborhood engine with a neighborhood information base, NIB, wherein the NIB is configured to contain at least one entry for neighbor nodes of the routing device; and
a forwarding engine with a forwarding information base, FIB, wherein the FIB is configured to contain at least one entry for destinations;
wherein the routing device is configured to:
extract a destination value from a first data packet;
search the FIB for the extracted destination value;
when the FIB contains an entry for the destination value, forward the first data packet according to the entry in the FIB;
otherwise, when the FIB does not contain an entry for the destination value, select a first group of at least two neighbor nodes from the NIB and forward the first data packet to the selected first group of at least two neighbor nodes in a spray operation mode, wherein, in the spray operation mode, the forwarding engine forwards the first data packet to the selected first group of at least two neighbor nodes that have a certain probability to be in contact with the extracted destination;
after forwarding the first data packet in the spray operation mode, receive a feedback packet from the selected first group of at least two neighbor nodes, and generate an entry in the FIB for the extracted destination based on the feedback from the selected first group of at least two neighbor nodes;
use the generated entry in the FIB for forwarding a second data packet in a focus operation mode, wherein in the focus operation mode, the forwarding engine forwards the second data packet to a neighbor node in accordance with an entry in the FIB.

2. The routing device of claim 1, wherein the routing device is configured to receive destination state information, DSI, from multiple neighbor routing devices, and further configured to determine a connection stability value to each neighbor routing device, and further configured to ignore the DSIs received from neighbor routing devices with a connection stability value below a predetermined stability threshold value.

3. The routing device of claim 1, wherein the routing device is configured to generate the entry in the FIB for the extracted destination so that the entry contains at least the destination value and the neighbor node via which the corresponding destination can be reached.

4. The routing device of claim 1,
wherein the routing device is configured to monitor a performance metric value of a data transmission process between the routing device and the extracted destination of the first data packet;
wherein, when the performance metric value increases, the routing device is configured to continue forwarding data packets to the extracted destination in accordance with an entry in the FIB, and additionally select a second group of at least two neighbor nodes from the NIB based on a connectivity characteristic between the routing device and the group of neighbor nodes and forward the first data packet to the selected second group of at least two neighbor nodes in a spray operation mode.

5. The routing device of claim 4, wherein the routing device is configured to receive a feedback packet from the at least two neighbor nodes from the second group and configured to generate an entry in the FIB for the extracted destination based on the feedback from the neighbor nodes of the second group.

6. The routing device of claim 5, wherein the routing device is configured to forward the first data packet to one neighbor node from the first group and to one neighbor node from the second group in a focus operation mode.

7. The routing device of claim 4, wherein the routing device is configured to remove an entry from the FIB based on the performance metric of the data transmission process between the routing device and the extracted destination of the first data packet when the performance metric of the data transmission of a specific entry in the FIB is higher compared to the performance metric of at least one other entry for the same destination.

8. The routing device of claim 1, wherein the routing device is configured to store the first data packet unless the FIB is populated with an entry that corresponds to the destination value extracted from the first data packet or when a connection of the routing device to the neighbor nodes of the first group is interrupted.

9. The routing device of claim 1, wherein the routing engine is configured to determine a set of next hops that are able to reach a predetermined destination with a predetermined cost.

10. The routing device of claim 9, wherein the routing engine is configured to receive a list of destination state information, DSI, from each neighbor node that is directly interconnected with the routing device, to announce a list of own DSI to each neighbor node, and to determine a subset of neighbor nodes to include in the RIB.

11. The routing device of claim 10, wherein a DSI includes information about the cost to reach a destination via a certain neighbor node.

12. The routing device of claim 1, wherein the destination value is an address of a destination node or a subnet; or
wherein the destination value is a data name.

13. The routing device of claim 1,
wherein the neighborhood engine is configured to collect information about a status of each one of the neighbor nodes of the routing device;
wherein the collected information includes parameters of:
availability of the neighbor node;
capacity of the neighbor node;
connectivity between the routing device and the neighbor node; and
link quality between the routing device and the neighbor node.

14. The routing device of claim 13, wherein the routing device is configured to repeatedly send a message to determine a value for the at least one of the parameters.

15. The routing device of claim 13,
wherein the neighborhood engine is configured to determine a stability of each neighbor node based on the availability, capacity, and link quality;
wherein the neighborhood engine is configured to provide the stability of each neighbor node to the routing engine and to the forwarding engine.

* * * * *